No. 722,366. PATENTED MAR. 10, 1903.
L. P. LARSEN.
REGENERATIVE APPARATUS FOR THE SIMULTANEOUS WARMING
AND COOLING OF MILK.
APPLICATION FILED SEPT. 9, 1901.
NO MODEL.
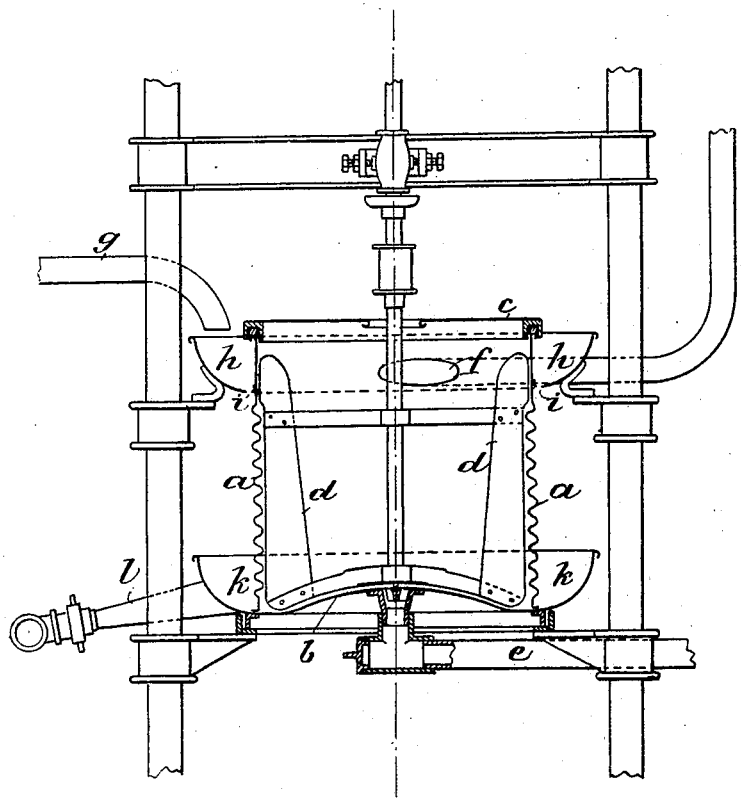
Witnesses
Isabella Waldron
Adelaide Claire Gleason
Inventor
Lars Peter Larsen
by Richards & Co
Attorneys.

UNITED STATES PATENT OFFICE.

LARS PETER LARSEN, OF HORSENS, DENMARK.

REGENERATIVE APPARATUS FOR THE SIMULTANEOUS WARMING AND COOLING OF MILK.

SPECIFICATION forming part of Letters Patent No. 722,366, dated March 10, 1903.

Application filed September 9, 1901. Serial No. 74,823. (No model.)

*To all whom it may concern:*

Be it known that I, LARS PETER LARSEN, director, of Horsens, in the Kingdom of Denmark, have invented certain new and useful Improvements in or Relating to Regenerative Apparatus for the Simultaneous Warming and Cooling of Milk, (for which I have applied for patents in Denmark on the 26th of July, 1901, No. 914; in Norway on the 5th of August, 1901, No. 14,144; in Sweden on the 5th of August, 1901, No. 1,398; in England on the 16th of August, 1901, No. 16,516; in France on the 6th of August, 1901, No. 301,851; in Belgium on the 16th of August, 1901, No. 125,677, and in Germany on the 5th of August, 1901,) of which the following is a specification.

This invention has reference to a regenerative apparatus for the simultaneous warming and cooling of milk, an apparatus based upon the principle of using opposing streams or currents in which the pasteurized or sterilized skimmed milk is led in an opposing direction to the unskimmed milk which is being led into the apparatus, the one warming the other and being at the same time cooled thereby.

The characteristic of the novel apparatus is that the milk—both the warm milk and the cold milk—is led over open and easily-accessible surfaces, which can readily be cleaned, so that the apparatus fulfils the main requirement of all apparatus required for the treatment of milk of being easily cleaned—a requirement which is not fulfilled in existing regenerative apparatus, in which the warm milk is led through a worm over which the cold milk runs, on which a deposit of so-called "milkstone" is formed, rendering it almost impossible to clean it.

The new apparatus, which is shown on the accompanying sheet of drawings, consists of a cylinder $a$, with polished undulated or screw-shaped ribbed surface, and is provided with a bottom $b$, a cover $c$, and a stirrer $d$.

The pasteurized milk which is to be cooled is led through a tube $e$ to the bottom of the apparatus and is driven up along the inner surface of the vessel by means of the stirrer $d$, finally passing out by the tube $f$, while the milk (containing its cream) is led in through a pipe $g$ to the annular edge of the cover or to a rim or edge $h$, arranged around the lid, this latter being provided internally next the cylinder with a number of small holes $i$, through which the milk trickles down along the wall of the cylinder and is collected in a rim or channel $k$, attached to the bottom of the vessel, so as to issue through the pipe $l$. It follows as a matter of course that the arrangement may be effected in such a way that the cold milk is brought up through the apparatus from below, while the warm milk enters from above. The result is, however, in either case the same. The hot and cold milk flow up and down on either side of the wall of the apparatus, but continuously and in opposite directions, with the result that the difference in the temperature between the cold and the pasteurized milk is completely equalized, while in addition the cold milk is warmed and the warm milk cooled by a temperature differing only about 30° from the temperature at which the warm and cold milk is introduced to the apparatus. For example, the temperature of the pasteurized milk when introduced is about 90° centigrade, that of the cream-containing milk 10° centigrade. The pasteurized milk will then be lowered about 40° centigrade and the fresh milk raised to a temperature of about 60° centigrade. Such a result would be impossible in the class of apparatus in which the cold and the warm milk move in the same direction on either side of a plate, as in such a case the most favorable result will be to equalize the temperature difference and to raise it in the case cited above to about 47°.

From what has been pointed out above it is clear that the novel apparatus by reason of its special construction and owing to the fact that it is based upon the principle of using currents in opposite directions attains the best possible result from the regenerative system, while at the same time the defect of previously-existing apparatus—namely, the difficulty or, to be more correct, the impossibility of cleaning—is obviated.

Having now particularly described and ascertained the nature of my said invention and in what manner the same is to be performed, I declare that what I claim is—

1. In combination, an open vessel, an inlet to the bottom of said vessel for milk at one temperature, an outlet for the milk near the top, means for imparting to said milk a centrifugal motion within said vessel, and means for causing a stream of milk at a different temperature to trickle down the outside of said vessel, substantially as described.

2. In combination, an open vessel having a corrugated wall, an inlet for milk at the bottom thereof at one temperature, a shaft rotating within said vessel carrying paddles, an outlet from said vessel near the top, a trough encircling the upper end of said vessel having an opening in the bottom in proximity to the outer wall of said vessel, a pipe for feeding milk at a different temperature to said trough and a trough near the bottom with a milk-outlet, substantially as described.

In witness whereof I have hereunto set my hand in presence of two witnesses.

LARS PETER LARSEN.

Witnesses:
MARCUS MÖLLER,
MAGNUS JENSEN.